(12) United States Patent
Cole et al.

(10) Patent No.: US 7,047,556 B2
(45) Date of Patent: May 16, 2006

(54) METHOD AND APPARATUS FOR EQUALIZING VIDEO TRANSMITTED OVER TWISTED PAIR CABLE

(75) Inventors: Gary Dean Cole, Corona, CA (US); Manfred Schneider, Costa Mesa, CA (US); Art Garcia, San Dimas, CA (US); Mike A. Andrews, Anaheim, CA (US)

(73) Assignee: RGB Systems, Inc., Anaheim, CA (US)

( * ) Notice: Subject to any disclaimer, the term of this patent is extended or adjusted under 35 U.S.C. 154(b) by 1034 days.

(21) Appl. No.: 09/877,984

(22) Filed: Jun. 8, 2001

(65) Prior Publication Data

US 2003/0169374 A1    Sep. 11, 2003

(51) Int. Cl.
*H04N 7/16* (2006.01)
(52) U.S. Cl. ............... 725/149; 348/914; 348/613; 348/621; 333/28 R
(58) Field of Classification Search ............ 725/149; 348/914, 613, 612, 621
See application file for complete search history.

(56) References Cited

U.S. PATENT DOCUMENTS

| | | | | |
|---|---|---|---|---|
| 4,273,963 A | * | 6/1981 | Seidel | 379/398 |
| 5,283,637 A | * | 2/1994 | Goolcharan | 348/14.12 |
| 5,987,065 A | * | 11/1999 | Candage | 375/232 |
| 6,377,629 B1 | * | 4/2002 | Stewart et al. | 375/257 |

OTHER PUBLICATIONS

Knobloch et al., Shielded or Unshielded Twisted Pair for High Speed Data Transmission?, 1998 IEEE, All pages.*
Raphael Horton, Color Video Travels on Twisted-Pair Cable; EDN Magazine, Feb. 3, 1994, pp. 1-2 and Fig. 1., National Semiconductor, Santa Clara, CA; http://www.ednmag.com/reg/1994/020394/03dil.htm. News Amplifiers Simplify Wideband Techniques; Maxim Integrated Products, pp. 1-11, http://dbserv.maxim-is.com/tarticle/view_article.cfm?article_id=57.

* cited by examiner

*Primary Examiner*—Chris Kelley
*Assistant Examiner*—Farzana Hossain
(74) *Attorney, Agent, or Firm*—The Hecker Law Group, PLC

(57) ABSTRACT

A apparatus and apparatus for compensating for video insertion loss due to transmission over long twisted pair cable lines is presented. Transmission of video over twisted pair cable is advantageous because of its superior cost advantage over coaxial cable. However, twisted pair cables have significant loss characteristics at the higher frequencies (i.e., broadband) compared to coaxial cables. At a transmitter station, the video signal is amplified in the high frequency region for possible skin effect losses thereby brute forcing the high frequency components to the receiving station. At the receiver station, the video signal is further compensated for diffusion line and skin effect losses. The total skin effect compensation applied in both the transmitter and receiver stations is such that the square root of frequency characteristics of skin effect losses is compensated for. Thus, at the receiving station, the high frequency compensation added at the transmitter to brute force the high frequency components to the receiving station may be removed if found excessive. Additionally, compensation is included to adjust for skew that may occur because of irregularities between the various twisted pairs used to transmit the individual video components. Non-minimum phase type filters are used to inject delay into the faster arriving signals so that they may coincide in phase with later arriving signals resulting in a true reproduction of the video.

22 Claims, 12 Drawing Sheets

METHOD AND APPARATUS FOR EQUALIZING VIDEO TRANSMITTED OVER TWISTED PAIR CABLE

BACKGROUND OF THE INVENTION

1. Field of the Invention

This invention relates to the field of video insertion loss equalization. More specifically the invention relates to compensating for losses in analog video quality due to transmission over twisted pair cable.

2. Background Art

Video cables are used to convey electronic video signals from a source device such as a receiver to a destination, typically a display device. A cable is supposed to accurately convey the signal, however, losses accumulate along the cable path because of imperfections in a transmission cable. These imperfections are not necessarily due to manufacturing but due to the fact that a cable is a physical device and most physical devices exhibit some losses when a signal is conveyed through them. Thus, the longer the cable length, the more losses accumulate. The accumulated transmission loss is known by those of skill in the art as cable insertion loss. Of course, other devices such as switches and splitters in a video transmission path contribute to the total video loss however only transmission cable insertion losses are considered in this specification.

Video may be transmitted either in digital or analog formats. For digital video transmission such as computer video, cable insertion loss is generally not an issue because the digital signal can be recovered so long as discernable digital pulses are received at the receiving station. However, for analog signals such as NTSC (National Television Standards Committee) video, the signal is just voltages, and voltages are affected by wire length, connectors, heat, cold, and other conditions. This degrading effect on the video signal caused by the transmission cable length is known as cable insertion loss.

Analog video such as the C-Video, S-Video, or YUV (or YIQ) specifications may be available in any of the different color models. A color model (also color space) facilitates the specification of colors in some standard, generally accepted way, for example, the RGB color model where R is for the red component, G is for the green component, and B is for the blue component. For high-resolution analog video, each color component is usually transmitted separately from the receiver to the display device. Thus, each color component must be examined for cable insertion losses.

A coaxial cable is typically used for transmission of high resolution (i.e., broadband) video because of its superior performance over twisted pair cable. However, coaxial cables are more expensive and difficult to install compared with twisted pair cables. Historically, the significant differences between coaxial cable and twisted pair cables limited twisted pair transmission to low-resolution video (i.e., less than 10 MHz). However, twisted pair has one distinct advantage over coaxial, i.e., cost/performance ratio. Dollar-for-dollar, twisted pairs are significantly cheaper than coax or fiber (i.e., fiber optic cable) to buy and install. And, while the coax and fiber offer some advantage in bandwidth, this advantage may be offset with proper compensation. Also, standard twisted pair, i.e., UTP/STP (Unshielded/Shielded Twisted Pair) cable contains four pairs in a single cable so that the actual cost per pair is one-quarter of the per-foot price. Therefore, transmission of broadband analog video over twisted pair cable is highly desirable.

The idea of high-data rate twisted pairs started with an attempt to organize cables into levels. In the process, it was recognized that twisted pairs could be made into higher grade data versions. These data-grade twisted pairs come in two flavors: twisted pairs commonly called UTP (unshielded twisted pairs) and STP (shielded twisted pairs). By far, most of the domestic data installations today employ UTP.

In the mid 1980's, twisted pair technology began to emerge which could transmit 2 Mbps, then 4 Mbps (the original IBM data rate), and then 10 Mbps. As these data rates increased, it became apparent that some way of indicating the performance of the cable was needed. It was then that the system of "Levels" was suggested. The TIA/EIA, two groups that set standards for the data industry, adopted the plan and separated the data rates and other parameters into "Categories", such as Category 3, 4, and 5. Category 4 cables are becoming extinct. Each higher numbered category has more stringent requirements with higher data rates and higher performance than the previous category. The specifications for Categories are given in TIA/EIA 568A.

Current twisted pair cables look identical to the plain old telephone service cable. They use the same color code and come in many of the same pair counts and use the same gage conductors. However, the specifications they are made to, the materials used to make them, and the requirements to connect them, become more and more critical as the data rate increases.

Twisted pair cable has many current common uses, such as in low-resolution video display systems and in business and corporation local area networks. With respect to low frequency performance of video displays, twisted pair cable carries horizontal line time, at frequencies that range from 15 to 50 KHz, for example. In order to display a complete video picture, each horizontal line sweep of the electron beam needs to be coordinated with color information and vertical line information. In computer monitors and displays, the picture information is displayed in "progressive" scan, i.e., one horizontal line right after another. This gives these displays excellent detail (which is required in the computer field) but requires double the amount of information as an interlaced analog broadcast receiver to display a picture at the same resolution.

Timing pulses can be used to ensure that each step in the process of transmitting video information occurs at the right time. However, although the video signals may be properly timed, all transmission lines have a characteristic signal loss in any system for which they are utilized. This characteristic signal loss in response to an applied electromagnetic wave along a cable is the insertion loss previously discussed. The efficiency of a transmission line carrying such a signal affects graphics image response and the degree of streaking across a picture screen. Low frequency streaking (or smear) across a video display screen, also known as picture effect, creates an overall appearance of detail loss and discontinuity critical to an observer's eye.

There are three key problems using twisted pair (e.g., UTP) for analog video. First, the majority of video equipment uses coaxial connectors, usually BNCs. The second is the output impedance of the coaxial systems is 75 Ω (ohms) while UTP has an impedance of 100Ω. The third difference is that UTP being twisted pairs is a "balanced line" system while coax, which has only one shielded conductor, is "unbalanced". Prior art devices attempt to solve these problems with a device called a "balun". Balun, in fact, means BALanced to Unbalanced. The balun is a small box which contains a transformer and other matching components allowing the signal to be converted from 75Ω impedance to 100Ω impedance. It can also change the signal from unbalanced to balanced; using a BNC connector (commonly used for coax) on one side of the box (i.e., input side) and an RJ-45, the most common UTP connector, on the other side (i.e., output side). However, baluns can only handle very narrow bandwidth and no DC component (basically a band-pass filter).

Balance is also a critical parameter. The nature of a balanced line means that the two conductors in the twisted pair are identical in length. The more identical they are, and the closer they are together, the easier it is for the balun to reject noise and interference generated outside the pair. When noise hits both conductors, and a resultant noise "pulse" is generated in both wires, the more identical the noise on each wire at the end of the cable, the greater the noise rejection can be ('common mode rejection') in a balanced line. The less identical, for example, standard telephone service lines are often very unequal, the more noise will get through.

Signal reconstruction at the far end depends on balance. Twisted pair is a difference technology. The effect in the receiver is not dependent on the voltages on the wires but the difference in the voltages on the wires. Currents in the wires that are identical will not contribute to the received signal. Practical circuits have limits in voltage range and current delivery to compensate for common mode voltages and currents. The difference in chassis ground voltages can be on the order of 5 volts at 500 feet in most industrial locations. Digital circuitry has large currents (20 to 50 amps in their ground planes causing 200 mV noise). Thus, to keep common mode signals from being converted into difference signals the impedances experienced by each line must be identical.

Common UTP/STP Properties

ACR is "attenuation-to-crosstalk ratio". By subtracting the attenuation from the crosstalk, a number is generated which can indicate the overall performance of a cable. Positive ACR, especially at high frequencies, can be an indicator of cable performance. On the other hand, it is possible to dramatically improve crosstalk, and thereby improve ACR, by unusually tight twisting of the conductor pairs.

Skew or Delay Skew is timing differences on a multi-pair cable. Skew is especially interesting when using more than one twisted pair to simultaneously deliver data, which is especially important with analog video transmission. In such systems, it is essential that the signals arrive at the other end of the cable at the same time. For example, the R, G, and B components of a high-resolution video are transmitted on separate wire pairs.

Transmission Lines

The next level of approximation deals with the behavior of the twisted pair line when the length of the line exceeds the longest wavelength of interest, which is almost always the case with video transmission. Under these conditions the classical RLC telephone equations apply for frequencies of the energy propagated throughout the line.

There are three frequency regions of interest: The diffusion region in which Resistance (i.e., R) per unit length is greater than Inductance (i.e., L) per unit length, the standard transmission telephone equation region, and the skin effect region. In the diffusion region (i.e., where R dominates over L), the classical telegraph equations apply. The Skin effect region, which is above 5 MHz with CAT5 twisted pair, is characterized by a loss that increases in proportion to the square root of frequency. In the limit the telephone equations devolve into the telegraph equations. Thus, the diffusion region and the telephone region may be combined and solved as a diffusion line problem, which can be approximated by several RC networks distributed over several decades of frequencies.

A typical insertion loss response indicates that for a given twisted pair cable, as much as two thirds of the insertion loss occurs in the first few megahertz of its operating frequency range. This loss is mainly due to diffusion in the wire. The magnitudes of each of these forms of signal loss are dependent on the effective capacitance of the wire. The combination of a long cable run with higher direct current (DC) loss coupled with the changing resistivity at low frequencies due to diffusion effect causes the transmission line to appear more like an R-C time response. This time response change causes medium to large details on the image to create a trailing streak as current is changing direction in the cable. The condition is commonly referred to as short-time or line-time distortion when seen in a video processing circuit which has a long response time constant, or time necessary for the system to reach steady state. The R-C like response time constant is related to the distributed capacitance times the distributed resistance, and it is generally accepted that the current becomes constant after five times the distance integral of this time constant. It is this long time constant that degrades the image to an unacceptable point in most cases.

Impedance

Impedance indicates the ability of a data cable to attach and transfer energy from one box to another. The impedance of the cable is determined by the physical construction of the system. The TIA/EIA standard for Category 5 is 100Ω±15Ω. Some Category 5 cables meet this spec. Others require the use of a smoothing formula called "Zo-fit". This allows manufacturers to ignore rapid changes in impedance. While many Enhanced Category 5 manufacturers say that their cable is "tested to 300 MHz" (or even up to 400 MHz), they offer no data (impedance, crosstalk, attenuation, ACR, skew etc.) at those high frequencies. Impedance variation can often be 100Ω±50Ω, rendering these cables virtually useless for uncompensated video transmission.

Bandwidth

Bandwidth is the range of frequencies available to be used for signal carrying. It is the "size of the tunnel". Bandwidth is a measure of the signal-carrying capacity of different cables. For broadband video, uniform amplitude and delays across colors are required.

Cable insertion loss can be characterized as a function of frequency (i.e., rate of the video input). FIGS. 1A and 1B illustrate such characteristics for a 300 feet Category 5 twisted pair cable. FIG. 1A shows the square root of frequency characteristics of the skin effect loss, while FIG. 1B is a more traditional view using a log-log scale. Insertion loss is specified in decibels (dB). As shown in the illustrations of FIGS. 1A and 1B, the insertion loss is approximately 0 dB when the input frequency is near zero, i.e., the output will be approximately equal to the input if the input is constant for a long period of time. In addition, the insertion loss increases as the input frequency increases. In general, insertion loss increases as the cable length over which the analog video is transmitted increases. This is why compensation is generally not needed and usually not applied for short cable runs, e.g., six feet or less.

Several compensation techniques may be used to compensate for cable insertion losses, however, in broadband systems where signals range from the steady state to several hundred megahertz, it is nearly unfeasible in terms of cost to compensate the entire frequency spectrum (typically 0–300 MHz). It is particularly problematic because of the shape of the frequency response characteristics of the insertion loss which shows rapid drop off in the low frequency range (0–10 MHz) and then followed by a shallow drop over the remainder of the frequency range (see FIG. 1A). The insertion loss characteristics at the low frequency region are due to diffusion in the cable. Cables of different type or length have different diffusion rates. Current industry methods effectively compensate for the high frequency end of the spectrum but not the low frequency end because of the complex frequency response characteristics associated with insertion loss of twisted pair cables. The problem with compensating for high frequency losses without compensating for the low frequency losses in video transmitted over long twisted pair cable is that people are more tolerant to seeing less sharp pictures (high frequency effects) so long as they can see the information. However, people are least tolerant of low frequency anomalies which are characterized by distortion or smearing type phenomenon across the video screen.

FIG. 2 is an illustration of a setup for a video display from a source signal to a destination display device. The input video signal is $V_{IN}$, and the output video signal displayed on display screen 200 is $V_{OUT}$. As discussed earlier, video input signal $V_{IN}$ is an analog voltage signal thus video amplifier 204 is used in a video receiver to condition the voltage to the level desired by the display device. Generally, video amplifier 204 conditions the analog video input signal to compensate for transmission line loss such that the proper video signal reaches display device 200. Block 208 is the operational amplifier gain and block 206 is the current feedback gain (generally representing resistive dividers). The feedback is from the output of the operational amplifier through resistors (represented by block B 206) to the negative input terminal of the operational amplifier. Thus, in this configuration, the transfer function between the input and output voltage of the video amplifier is $A/[1+AB]$.

Twisted pair cable line 202 represents the total cable length the video must travel from the input source to display device 200. Thus, assuming there is no change in voltage at VGA to TP Converter 204, FIG. 1 would represent the frequency responses between input signal $V_{IN}$ and output signal $V_{OUT}$ for a 300-foot twisted pair cable. FIG. 3 shows the transient response characteristics of a fixed length twisted pair cable. Using FIG. 2 as an illustration, a step input (e.g., 300), which is characterized as having frequency content from zero to approximately infinity, is introduced at $V_{IN}$. The transient response output $V_{OUT}$ (e.g., 310) is shown in FIG. 3. Region 320 represents the low frequency diffusion effects while region 330 represents the high frequency skin effects of the transmission cable. The effect of the low frequency characteristic of the transmission cable is also evidenced by the large rise time, i.e, time it takes the output to reach 90% of steady state. The gradual rise of the response (i.e., 310) over a long period of time appears as a smear or shadow effect on the uncompensated video signal at display 200. Large rise time is synonymous with low bandwidth. Thus, the twisted pair cable introduces a low bandwidth filter effect on the input video signal passing through it. Generally, rise time increases with decreasing characteristic bandwidth and longer cable lengths tend to produce lower characteristic bandwidth.

To illustrate the filter effect of the twisted pair cable, FIG. 4 shows a low pass filter being used as an example to represent the effect of cable line 202 of FIG. 2. That is, the low-pass filter represents the transfer function between the input and output of the twisted pair cable. Using low pass filter 400 with bandwidth ω representing the characteristic bandwidth of the cable length, $V_{OUT}$ is given by the equation:

$$V_{OUT} = \frac{A}{[1+AB]} \frac{1}{\left[\frac{1}{\omega}s+1\right]} V_{IN}$$

Thus, the goal is to make bandwidth ω as large as possible so that the frequency response between the input and output videos remains as flat as possible to a frequency high enough that any distorting effects caused by the transmission line are not discernable by the human eye. One way to compensate for the effect of the low bandwidth ω of the cable characteristics is to include the twisted pair cable line loss in the feedback loop as shown in FIG. 5. Thus, instead of the current feedback originating directly from the output of video amplifier 504, cable characteristic 400 is included in the closed loop and thereby compensated for in video amplifier 504. The resulting transfer function between input $V_{IN}$ and output $V_{OUT}$ is given as follows:

$$V_{OUT} = \frac{A}{[1+AB]} \frac{1}{\left[\frac{1}{(1+AB)\omega}s+1\right]} V_{IN}$$

Thus, the new bandwidth between the input and output voltage is increased by the factor (1+AB) and thus directly controllable by the gains chosen for the video amplifier feedback. However, this implementation would require feedback from a long (e.g., 200 feet) cable back to the video (i.e., operational) amplifier 504 which is located at the source. Firstly, this is impractical and secondly there is a significant amount of time delay involved in feeding back from the long cable runs. Long feedback delays tend to cause loop instability and thus limits loop gains that can be used in the video amplifier. The most practical way of compensating for the cable insertion loss characteristics is to duplicate those characteristics in the feedback path as shown in FIG. 6 thus eliminating the time delay involved in feeding back from a long cable run.

FIG. 6 illustrates the most practical way of compensating for cable insertion loss. Mathematically, this provides the same results as FIG. 5 above, i.e., the loop bandwidth is increased by [1+AB]. Assuming the gain B is unity, then $V_{OUT}$ approaches $V_{IN}$ as A increases. In a perfect situation, Block 600 replicates the inverse of the cable characteristics. However, cost prohibitions may make it impractical to create analog circuitry for block 602 in video amplifier 600 that duplicates the cable insertion loss characteristics 400 in a wide frequency range as shown in FIG. 1. Thus, prior art implementations tend to only compensate for the high frequency losses by adding "peaking" compensation, i.e., pole-zero pair to boost the response at the high frequencies.

SUMMARY OF THE INVENTION

This invention defines a method and apparatus for enhancing or improving the quality of high-resolution video images by compensating for the losses caused by transmission of the video signal over long twisted pair cables. The loss that occurs during transmission of the video signal is known as cable insertion loss. Transmission of video over twisted pair cable is advantageous because of its superior cost advantage over coaxial cable. However, twisted pair cables have significant loss characteristics at the higher frequencies (i.e., broadband) compared to coaxial cables. In one embodiment of the invention, the video signal is pre-compensated at a transmitter station for possible skin effect losses before being injected into the twisted pair line for transmission to a receiver station. The pre-compensation at the transmitter station amplifies the high frequency region to brute force the high frequency signals to the receiver station. Amplifying the high frequency spectrum of the video at the transmitter station prevents boosting of noise that may have been picked-up during transmission over the twisted pair cables to the receiver station, which may be up to 1000 feet from the transmitter station.

At the receiver station, the video signal is further compensated for diffusion line and skin effect losses. The total skin effect compensation applied in both the transmitter and receiver stations is such that square root of frequency characteristics of skin effect losses is compensated for. Thus, at the receiving station, the high frequency compensation added at the transmitter to brute force the high frequency signals to the receiving station may be removed if found excessive (i.e., unnecessary because of short transmission line length, for example). Embodiments of the present invention add compensation as desired to cover the frequency range of interest. For example, several RC circuits may be cascaded to increase the video transmission bandwidth.

An embodiment of the invention further adds compensation to adjust for skew that may occur because of irregularities between the various twisted pairs used to transmit the individual video components. Non-minimum phase type filters are used to inject delay into the faster arriving signals so that they may coincide in phase with later arriving signals thus resulting in true reproduction of the video.

DETAILED DESCRIPTION OF THE INVENTION

An embodiment of the invention comprises a method and apparatus for equalization of video transmitted over long twisted pair cables. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

An embodiment of the invention provides a method and apparatus for enhancing and improving the quality of video images by compensating for the loss and other effects of transmitting video over a medium such as twisted pair cables. For instance, one embodiment of the invention uses a configuration consisting of compensation for the diffusion effects, skin effects, and skew due to dissimilarities between different cable pairs.

Figure 1A:
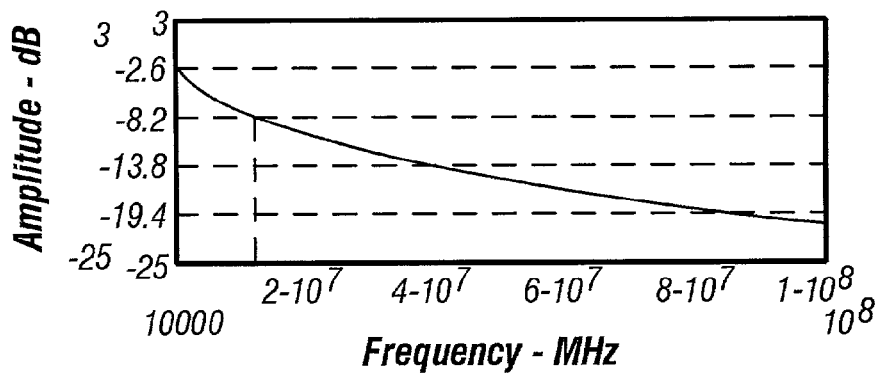
FIGS. 1A–1B are illustrations of the frequency response characteristics of the insertion loss in a twisted pair cable.
Figure 1B:
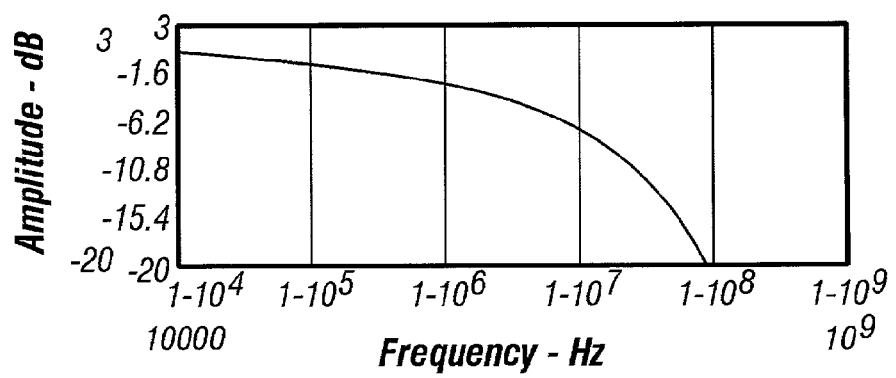
Figure 2:
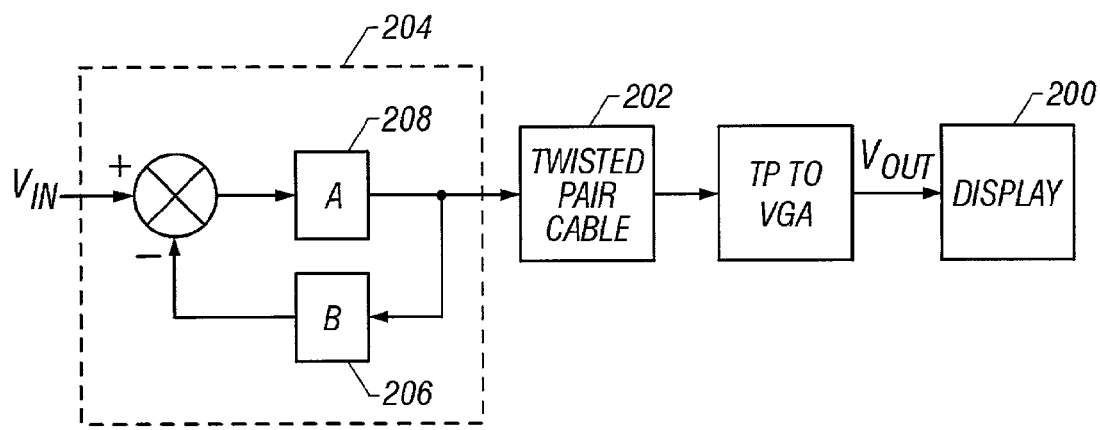
FIG. 2 is an illustration of a schematic for typical video display originating from a source signal to a destination display device.
Figure 3:
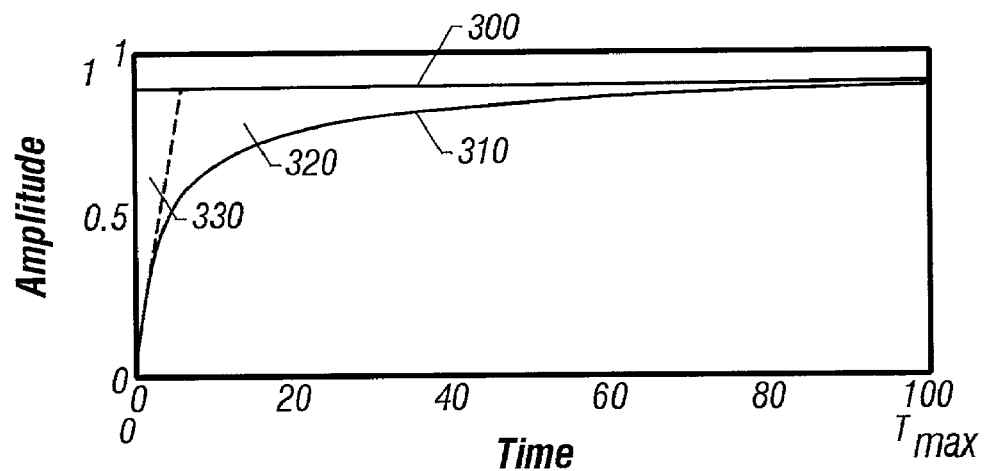
FIG. 3 is the transient response characteristics of a fixed length twisted pair cable.
Figure 4:
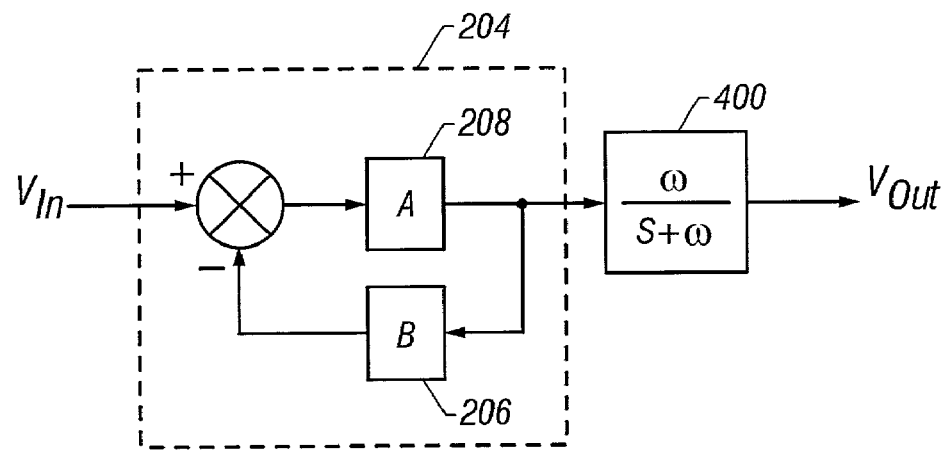
FIG. 4 is an illustration using a low pass filter to represent the effect of cable insertion loss characteristics.
Figure 5:
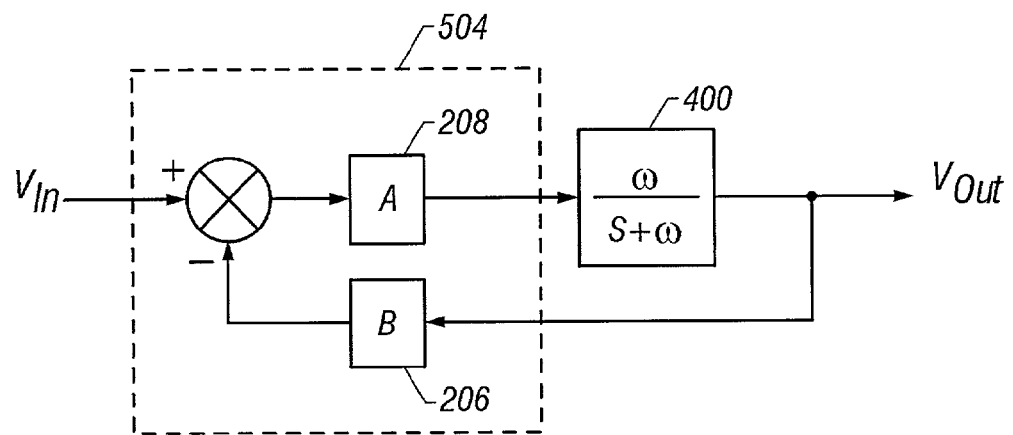
FIG. 5 is an illustration of a technique to compensate for the effect of the insertion loss through the twisted pair cable by including the entire twisted pair cable line in the video amplifier feedback loop.
Figure 6:
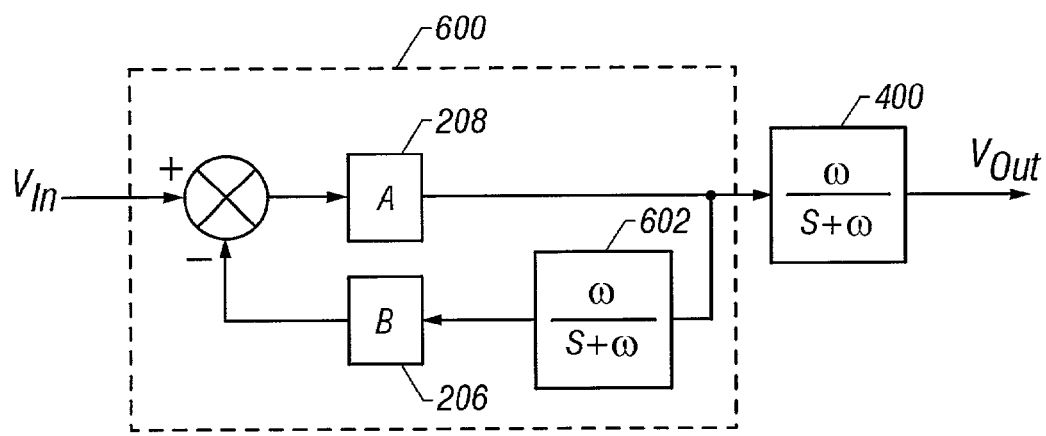
FIG. 6 is an illustration of a technique to compensate for the effect of the insertion loss through the twisted pair cable by including the characteristic effects of the twisted pair cable line in the video amplifier feedback loop.
Figure 7:
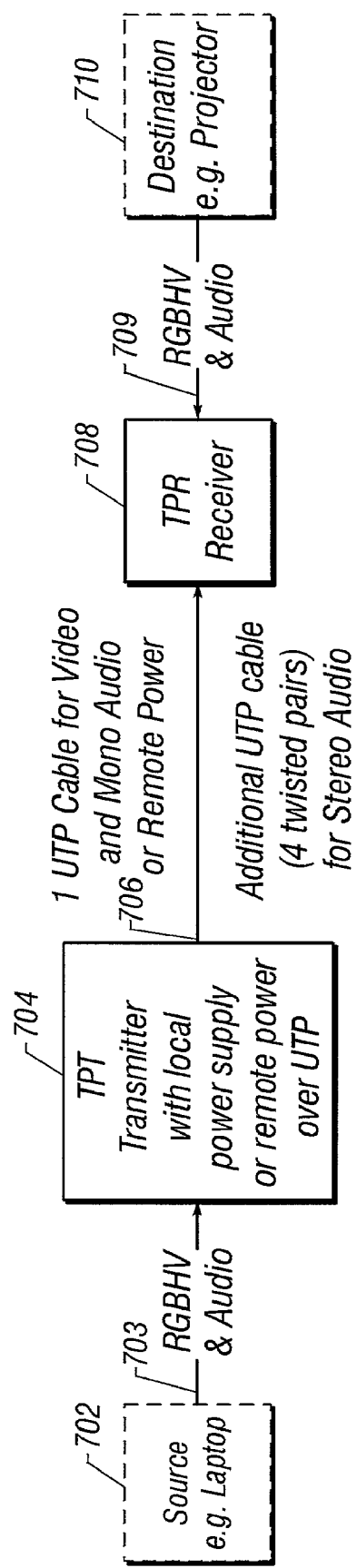
FIG. 7 is a functional block diagram illustrating equalization of video transmitted over twisted pair cable in accordance with an embodiment of the present invention.

FIG. 7 is a functional block diagram illustrating equalization of video transmitted over twisted pair cable in accordance with an embodiment of the present invention. The invention comprises Twisted Pair Transmitter (TPT) 704 and Receiver (TPR) 708 connected together by twisted pair cable 706. TPT 704 receives video signal from source 702 via cable 703. Source 702 could be a laptop computer, for example, and cable 703 could be a short coaxial cable. Video, comprising the various color-components (e.g., RGB) and the horizontal and vertical sync pulses, and audio are transmitted from source 702 to TPT 704 for additional processing. TPT 704 processes the individual color components, including the sync and audio signals, by adding appropriate compensation in accordance with embodiments of the present invention. For example, TPT 704 adds high frequency compensation for skin effect losses by adding peaking compensation. That is, the response at the high frequency region is boosted before the signal is inserted into the twisted pair line 706. However, this high frequency compensation may be removed at TPR 708 if not desired. For example, the compensation may be removed if the length of cable 706 is insufficient to justify the compensation at the TPT. Typically, when twisted line pair 706 is of considerable length, compensation must be added to restore the video quality. The issue then becomes where to add the compensation?

Depending on the desired video bandwidth, the range of frequency desiring compensation may be considerable. For example, broadband video may require compensation from the low Kilohertz region to above 100 MHz region. Thus, several RC compensation networks may be required to obtain a flat frequency response over such a broad range of frequencies. The desired compensation may be divided into low and high frequency compensation. Care must be exercised during high frequency compensation to prevent from boosting noise picked up during the video transmission. An embodiment of the prevent invention adds high frequency boosting at the transmitter to assure reproduction of the video, not noise, at the receiver. Thus, by adding the high frequency lead (i.e., peaking) compensation at the transmitter (i.e., TPT 704), the present invention prevents potential boosting of noise at the receiver (i.e., TPR 708) to compensate for transmission line loss. The TPT (e.g., 704) transmits the compensated video and audio signals to TPR 708 via twisted pair cable 706. Cable 706 comprises a plurality of twisted pair cables that may be of the shielded (STP) or unshielded (UTP) variety and of appropriate category (e.g., Cat 5). Each twisted pair carries a color component from the transmitter to the receiver.

Because twisted pair is a difference technology, signal reconstruction at the far end (i.e., at TPR 708) of a twisted pair system depends on balance in the transmission line (e.g., 706). Therefore, the effect in the receiver is not dependent on the voltages on the wires but the difference in the voltages on the wires. Thus, currents in the wires that are identical will not contribute to the received signal. Practical circuits have limits in voltage range and current delivery to compensate for common mode voltages and currents. Embodiments of the present invention employ impedances lower than many common mode noise sources thereby resulting in amplitudes less than 9 volts from the noise sources thus providing better common mode noise rejection. Therefore, embodiments of the present invention may operate reliably with up to 9 volts peak common mode signal whereas prior art systems operate approximately with 1 volt common mode rejection.

Many common mode noise sources have impedances higher than that found in the present invention and as a result will not develop much common mode voltage. For Example, Conducted EMI (Electro-Magnetic Interference) filters connected to chassis ground which are not connected to a common earth ground have the potential to deliver 5 ma or 55 V RMS to the transmitter (i.e., TPT 704). The TPT can handle approximately 20 times the power available from this noise source with an excellent resulting picture. The receiver, TPR 708, performs additional processing after receiving the video signals from twisted line pair 706. This processing may include: removing some or all of the high frequency compensation added at TPT 704 if the line length of cable 706 is insufficient to justify the compensation, adding low frequency compensation for the diffusion characteristics of twisted pair line 706, adding additional high frequency compensation as desired, adding compensation for skew that may occur between the color components that are transmitted over different twisted pairs, DC (i.e., steady state) restore level translation (because the video is negatively biased at the TPT before injection into the twisted pair line), and sync pulse recovery.

After processing the video and audio signals, TPR 708 transmits the processed signals to destination device 710 using an appropriate transmission medium 709. Destination device 710 could be a projector, for example. Using the methods of the present invention, the broadband video display at destination 710 appears clear and without the deformities that would otherwise be evident with video signals transmitted over twisted pair cable of significant length.

Figure 12:
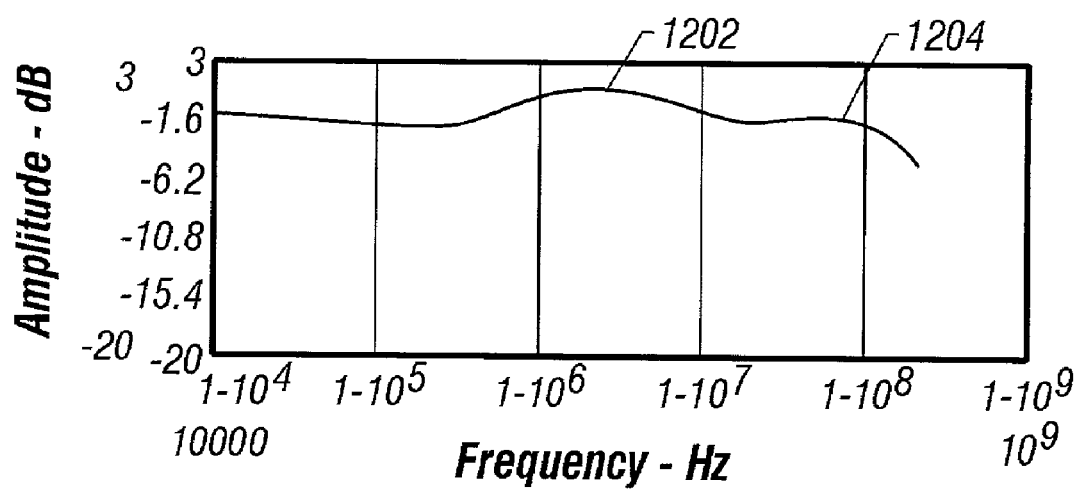
FIG. 12 is a frequency response illustrating the resulting video signal with high frequency compensation for skin effect in accordance with an embodiment of the present invention.

FIG. 12 is a frequency response illustrating the resulting video signal with high frequency compensation for skin effect in accordance with an embodiment of the present invention. The illustration shows the effect of two simple zeros, cut in at different frequencies, to approximately counteract the skin effect losses. The zeros are illustrated by the humps at 1202 and 1204. The hump at 1202 may represent the high frequency compensation applied at the transmitter, for example, while the hump at 1204 may represent the compensation applied at the receiver. Thus multiple RC circuits may be used to maintain a flat frequency response up to a desired frequency. The net effect of both zeros is to flatten the frequency response (i.e., less than ±3 dB) up to 100 MHz, approximately. Note that for good screen graphics at display 710, good frequency response characteristics from 50 Hz to 100 MHz is especially important.

Twisted Pair Transmitter

Figure 8:
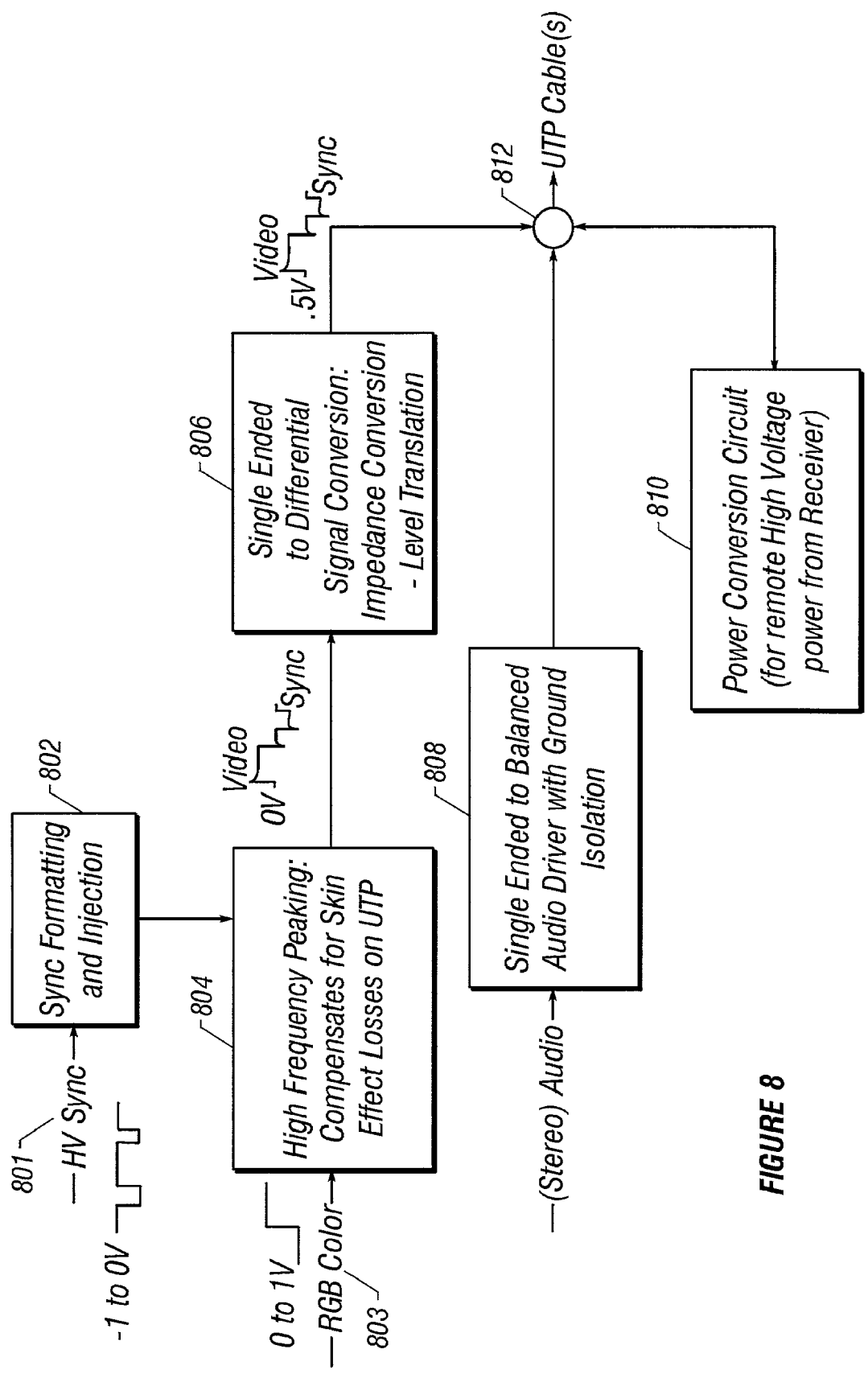
FIG. 8 is a functional block diagram of the twisted pair transmitter in accordance with an embodiment of the present invention.

The twisted pair transmitter, TPT 704, provides pre-compensation of the signal to be transmitted to the video display, i.e., TPT 704 prepares the video and audio signals for transmission over the twisted pair cable. FIG. 8 is a functional block diagram of the twisted pair transmitter in accordance with an embodiment of the present invention. At block 802, the horizontal and vertical sync signals 801, received from an input video source, are used to generate sync drive signals. The sync drive signals are then summed, in block 804, with selected color components of video input signal 803. For example, in an embodiment using the RGB color system (i.e., video input signal 803 is in the RGB format), the horizontal sync drive may be injected into the blue (i.e., B) component while the vertical sync drive is injected into the green (i.e., G) component. It will be apparent, however, to one skilled in the art, that the choice of blue and green color components for sync drive injection is arbitrary. An embodiment of the present invention recovers the sync pulses at the receiver; thus, it is desirable to know in which color components the appropriate sync pulses are carried.

The transmitter further compensates the color components for potential transmission line (i.e., insertion) losses at block 804. As discussed earlier, because there is no appreciable region of the classical LC transmission line, the video insertion loss can be grouped into two major loss regions for compensation: the diffusion line region, and skin effect region. From the transmitter view the diffusion line looks like an RC circuit with the capacitor directly loading the source impedance. The lower the source impedance, the closer the resultant launched signal will be to the input signal. Thus, an embodiment of the TPT drives with the lowest practical source resistance which can maintain acceptable balance and stability with the driving operational amplifier. If a near perfect termination is used at the TPR, the reflected energy is minimal due to the rapid onset of skin effect losses.

In an embodiment of the present invention, the TPT compensates for the potential high frequency loss because boosting at the transmitter instead of at the receiver assures that video, not noise, is being amplified. The high frequency compensation is for skin effect losses which generally applies for frequencies greater than approximately 3 MHz, for a twisted pair cable. Since video may be transmitted over twisted pair cable ranging from 50 to 1000 feet in distance, it is desirable to provide appropriate compensation to brute force high frequency signals to the receiver. For example, it is desirable to provide high frequency compensation covering approximately two decades of frequency. Thus, an embodiment of the present invention utilizes compensation in both the transmitter and receiver to achieve the desired high frequency coverage.

Figure 17:
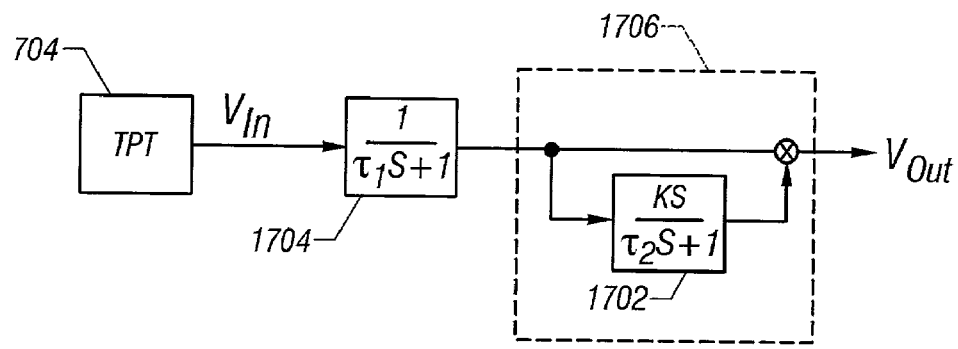
FIG. 17 is an illustration of a feed-forward compensation technique in accordance with an embodiment of the present invention.

The transmitter, in accordance with an embodiment of the present invention, uses feed forward complex RC Voltage dividers to optimize the high frequency level for the target maximum distance. Embodiments of the present invention utilize feed-forward compensation instead of feedback to prevent loop instabilities and thus allowing the use of as many RC networks as needed to provide the desired frequency response. FIG. 17 is an illustration of a feed-forward compensation technique in accordance with an embodiment of the present invention.

In this illustration, a simple low-pass filter with transfer function 1704 is used to represent the transmission line characteristics (e.g., diffusion or skin effect) of the twisted cable. In order to compensate for the transmission line loss (i.e., shift the bandwidth as high as possible), feed-forward compensation is added in the form of high-pass filter 1702 in block 1706. Block 1706 may be contained in the receiver, for example, if used for diffusion line compensation. It may also be contained in either the transmitter or the receiver if used for skin effect compensation. The resulting transfer function between the input, $V_{IN}$, and output, $V_{OUT}$, is given by:

$$V_{OUT} = \frac{1}{[\tau_1 s + 1]} \frac{[(\tau_2 + k)s + 1]}{[\tau_2 s + 1]} V_{IN}$$

Because the purpose of the compensation is to shift the total system response bandwidth upwards, $\tau_2$ is usually much less than $\tau_1$ (where $\tau$ is the inverse of bandwidth). Therefore, the bandwidth of the response will be shifted to the inverse of $\tau_2$ when $(\tau_2+k)$ equals $\tau_1$. Thus, embodiments of the present invention provide the capability to adjust the gain k (e.g., bias of the variable transconductance amplifier discussed below) to achieve the desired frequency response. In one or more embodiments, a series of feed-forward compensation 1706 may be cascaded to broaden the system bandwidth.

Figure 9:
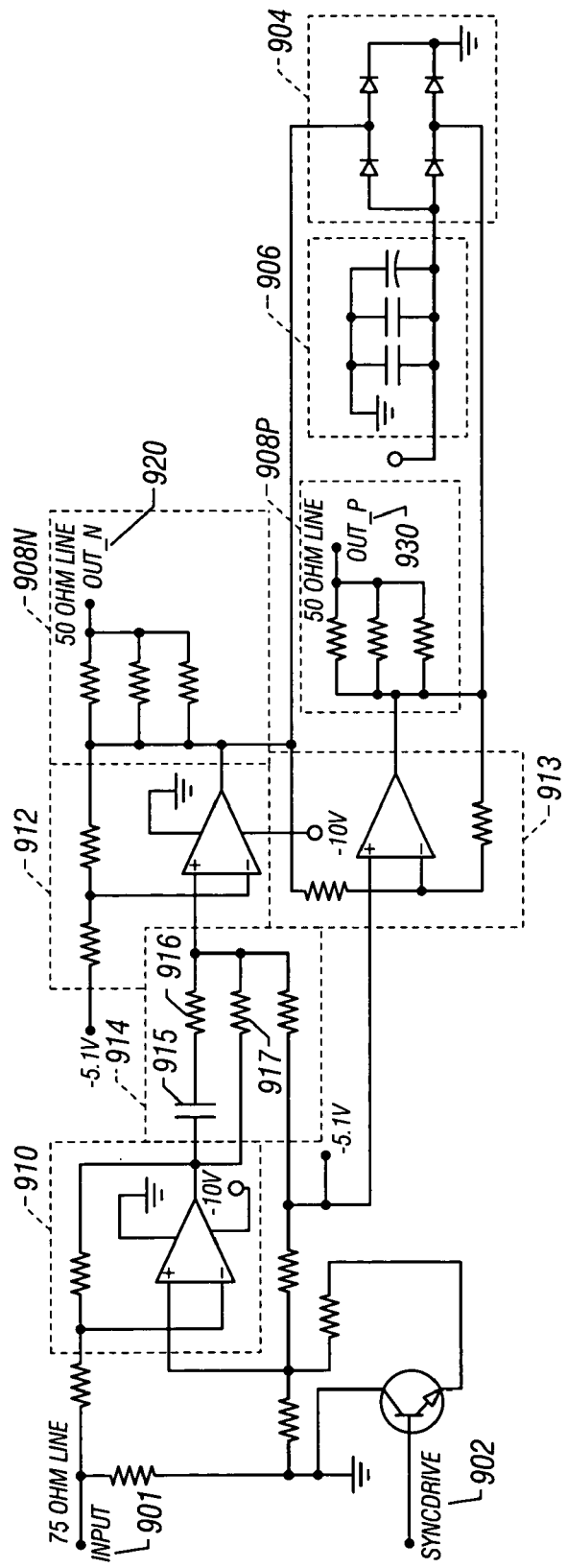
FIG. 9 is an example compensation circuitry in the transmitter for a color component in accordance with an embodiment of the present invention.

FIG. 9 is an example compensation circuitry in the transmitter for a color component in accordance with an embodiment of the present invention. For example, RC group 915 and 916 may provide the lead (i.e., feed forward) compensation while RC group 915 and 917 control the bandwidth of the lead-compensating filter. In other embodiments, devices such as a voltage variable capacitance (a.k.a. hyperabrupt varicap) diode may be used to achieve the desired lead compensation. It will be apparent to those of skill in the art that other methods and devices may be used to achieve the feed-forward compensation and thus is not limited to the structure described herein. The circuit of FIG. 9 is for illustrative purposes only and is not intended to limit the scope herein. For example, other circuits may include different combination and arrangement of resistors and capacitors (e.g., variable capacitors and/or resistors). Further, note that in this illustration, a sync drive signal is injected into the color component signal via the transistor at 902, into the inputs of differential amplifier circuitry 910, before the high frequency (i.e., skin effect) compensation is applied. Other embodiments may inject the sync drive after the compensation is applied or at some intermediate point. Note that when the transistor is off, it does not contribute noise to the active video.

The transmitter converts the single ended input 901, i.e., a color component of the video input, plus any included sync signal 902 into differential signals and thus generating negative output 920 and positive output 930 having the appropriate high frequency amplification. Amplifiers 912 and 913 provide the appropriate voltage drive through impedance matching resistors 908N and 908P. Block 906 is supply filtering while block 904 is transient pulse absorption.

Referring back to FIG. 8, the transmitter also provides conversion (e.g., at block 806) of the single ended input signal, which may be from a 75-Ohm source, for example, into differential signals with appropriate impedance. The differential signals are negatively biased before injection in order to prevent metallic ion migration (i.e., dissipation) of physical cabling during long term operation in a humid environment. For example, as illustrated in FIG. 8, the DC level that was 0V at the output of block 804 is translated to −5V at the output of block 806.

Impedance conversion in accordance with an embodiment is illustrated in resistor blocks 908N and 908P of FIG. 9. Impedance has two aspects: One is launching the signal into the line and the other is receiving the signal from the line. A diffusion line has a major portion of its wire to wire and wire to world capacitance available to load the source resistance. To minimize the effect of this capacitance, driving the signal into the line with the lowest practical resistance is desired. This becomes the lowest frequency compensation for the diffusion line problem. Since it is desirable to keep the source impedance equal to the line impedance to minimize reflections, and because of common mode considerations, an embodiment of the present invention uses termination with three parallel resistors, illustrated in blocks 908N and 908P, on each leg of the difference line driver. For example, three resistors having values of 100 Ohm each may be used thereby resulting in 33 Ohm driving resistance.

All the energy not absorbed by the far end terminations at the receiver is reflected back down the transmission line to the transmitter. Thus, it is imperative that the end termination (i.e., at the receiver) be as perfect as possible. When using CAT-5, for example, the reflected energy for all frequencies above 2 MHz may be minimized with a 100-Ohm load. For frequencies below 2 MHz, the diffusion equations for twisted pair cables do not exhibit the reflection phenomena because inductance is not an important current driver.

However, it is desirable that the output differential drivers be selected for high power and speed in order to provide linear response with significant common mode currents and to provide the slew rate required to overcome high skin effect losses at appreciable distances.

Referring back to FIG. 8, additional function of the TPT includes single ended to balanced audio drivers at block 808 and power conversion circuit (i.e., power for the remote receiver), if desired, at block 810. The compensated video, audio, and power signals are then injected into the twisted pair cable at block 812 for transmission to the receiver 708 (FIG. 7).

Twisted Pair Receiver

Figure 10:
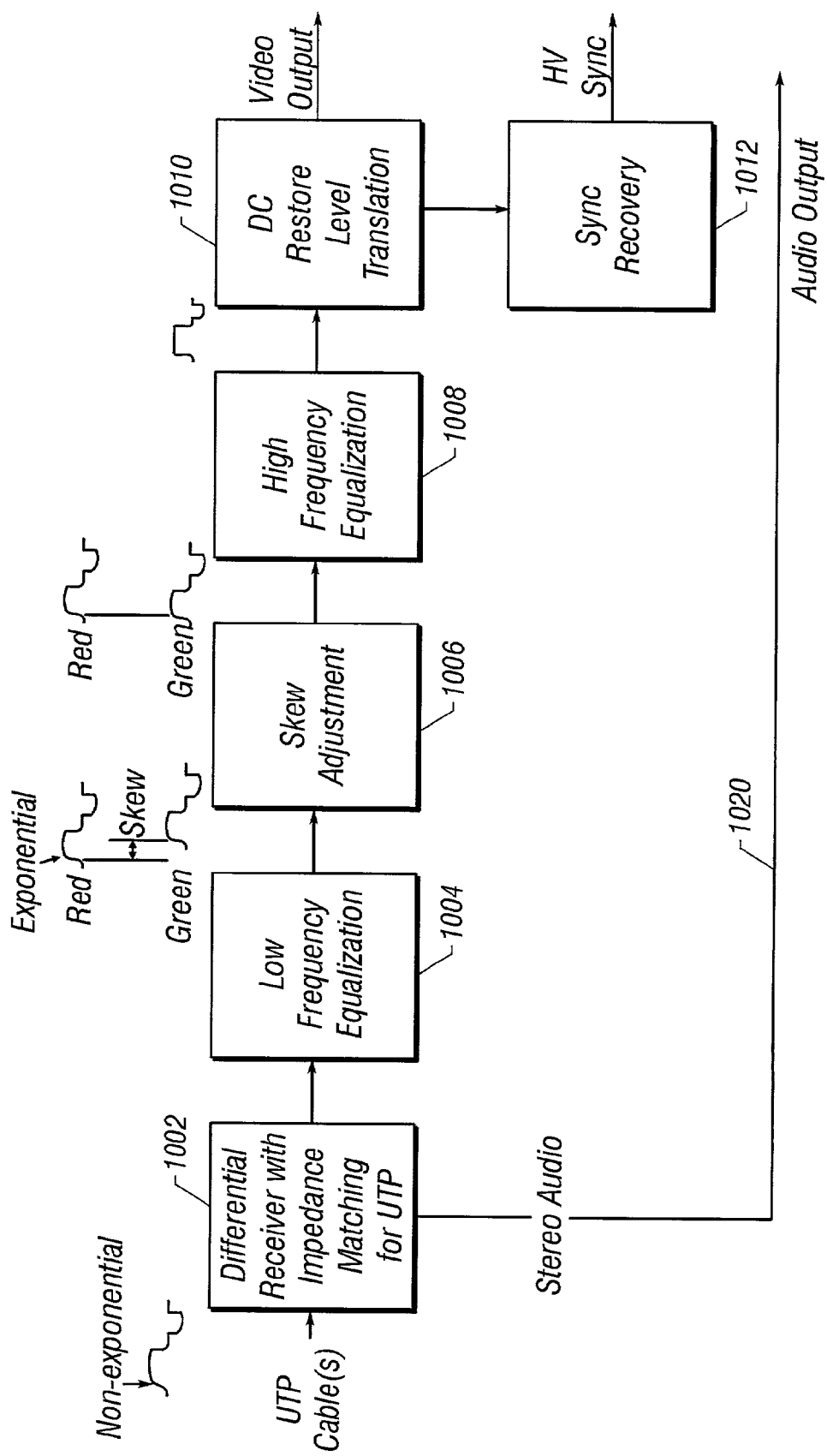
FIG. 10 is a functional block diagram of the twisted pair receiver is, in accordance with an embodiment of the present invention.

The receiver (e.g., 708) provides the necessary compensation at the other end of the twisted pair cable system. A functional block diagram of the twisted pair receiver is illustrated in FIG. 10, in accordance with an embodiment of the present invention. The twisted pair receiver comprises the differential receiver function 1002, the low frequency equalization function 1004, the skew adjustment block 1006, high frequency equalization block 1008, steady state (i.e., DC) restore level transition block 1010, and sync recovery block 1012.

Figure 11:
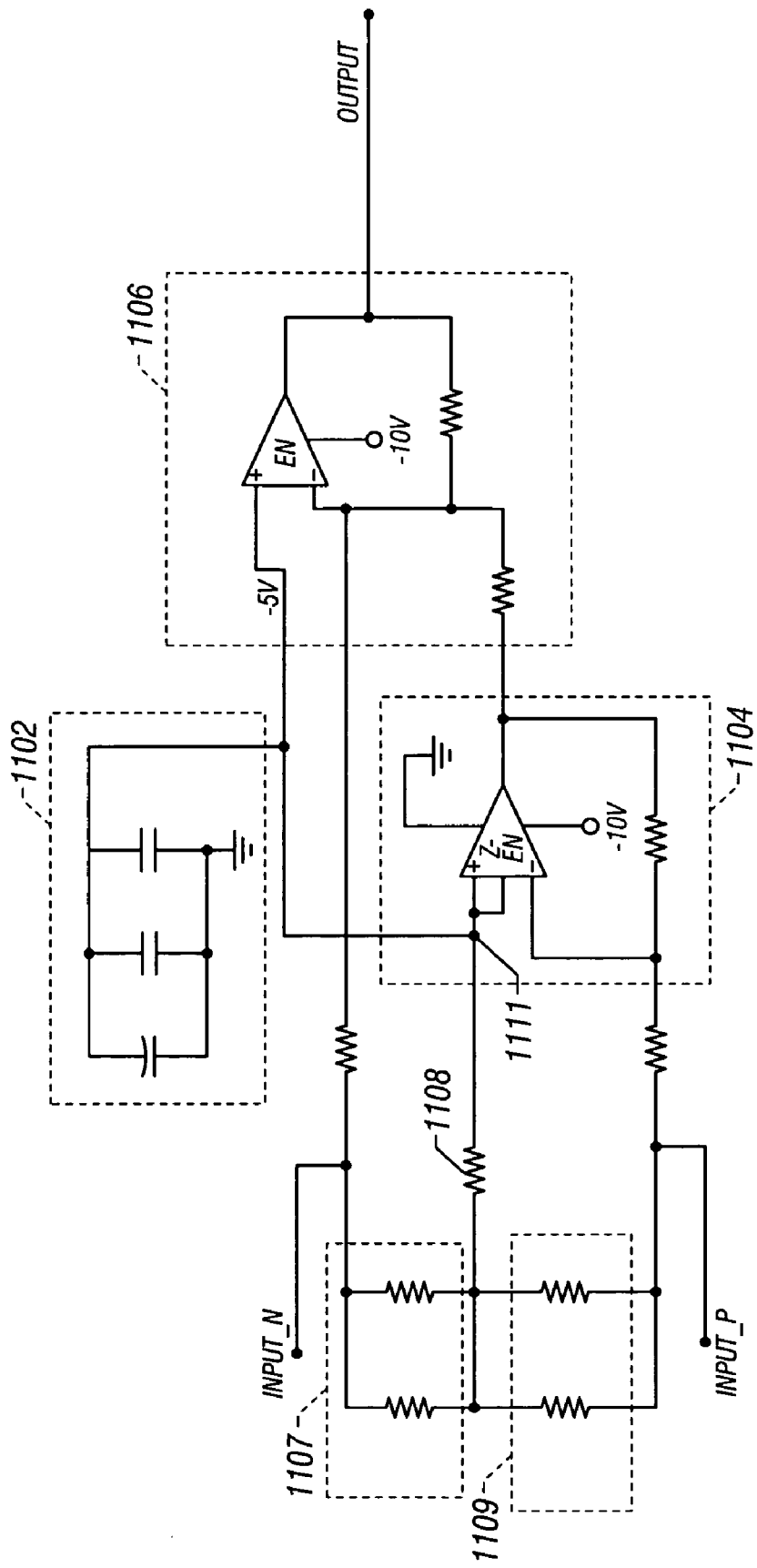
FIG. 11 is an illustration of the differential receiver block according to an embodiment of the present invention.

The differential receiver block is further illustrated in FIG. 11. The differential receiver converts the common mode voltage into current and then virtually grounds the current through capacitance block 1102 to avoid input common mode restrictions of the operational amplifiers. It uses a two-stage amplifier process to control the peak common mode rejection. In one embodiment, a resistor 1108 is placed between the junction of the term resistors (e.g., 1107 and 1109) and the signal reference (e.g., 1111) to reduce the transmitter current. The resistor restricts common current and thus allows higher common mode voltages to avoid transmitter saturation. Circuit 1104 also reduces the gain of the input circuit to values less than unity thereby preventing amplification of noise by the differential amplifier. Finally, the common current component is passed through to differential amplifier 1106 to allow independent setting of the common current gain to a desired level while keeping a high difference gain.

Low Frequency Equalization

Figure 13:
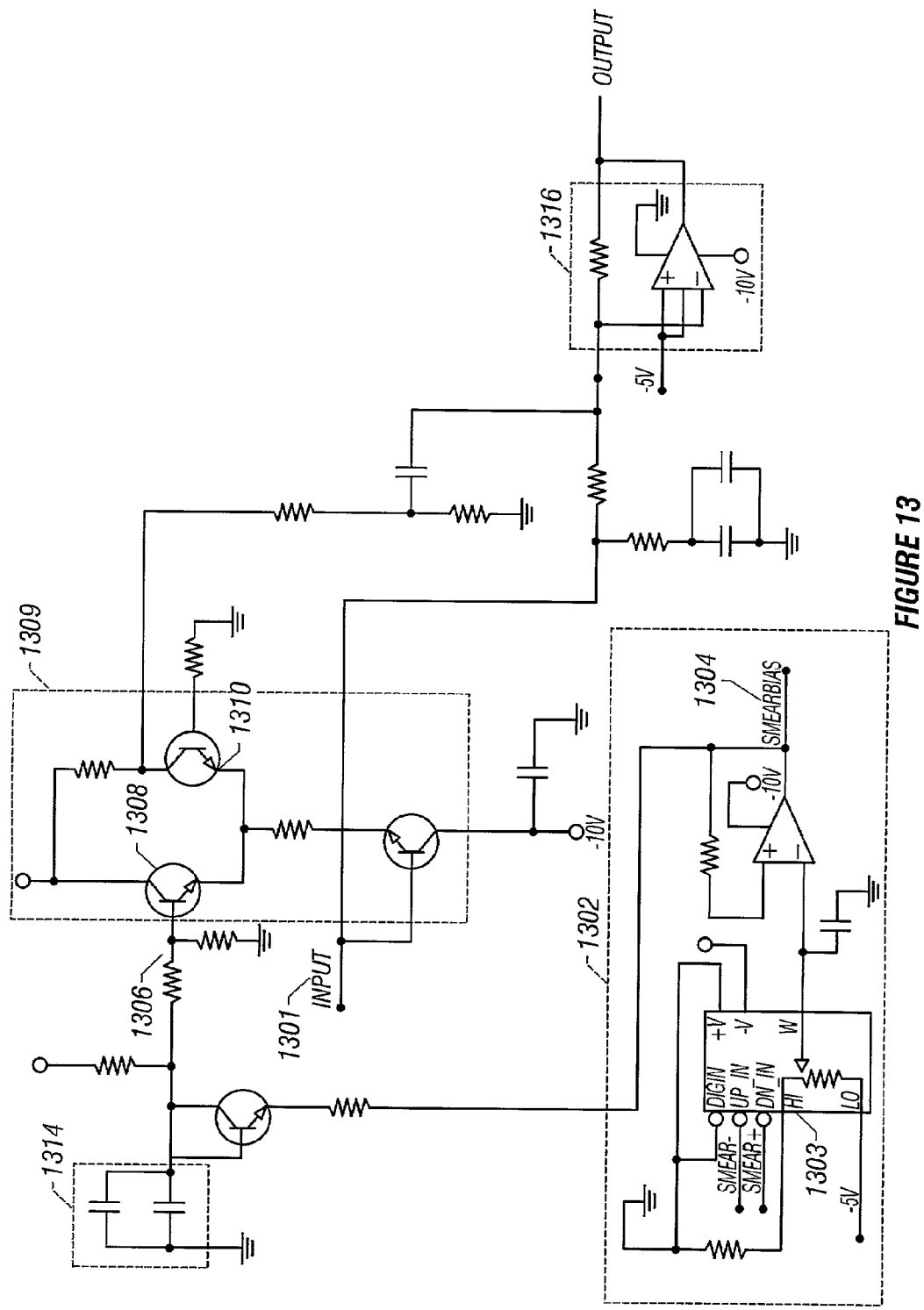
FIG. 13 is a schematic illustrating low frequency equalization in accordance with an embodiment of the present invention.

The low frequency compensation is basically an inverse diffusion problem. Basically, one or more CR (i.e., high-pass) filter circuits are used to compensate for the diffusion line problem. Note that the inverse characteristic of the diffusion line may be duplicated with proper choices of corner frequency of the filters. As discussed earlier, the diffusion line's response is affected by distance. Thus, the diffusion characteristics vary for different length cables. Therefore, any diffusion compensation should operate properly for varying cable lengths, which are typically greater than 50 feet. In some cases, compensation may be required for cable lengths lesser than 50 feet. One or more embodiments of the present invention allow shifting of the compensation network's effective zeros and poles in order to adjust the circuit for cable length. The shifting may be accomplished by extending the "Miller Effect" idea by adjusting the gain of the signal delivered to the compensation network. For example, a compensation network that uses transconductance amplifiers provides means for adjustable input gains. FIG. 13 is a schematic illustrating low frequency equalization in accordance with an embodiment of the present invention. Low frequency equalization, or inverse diffusion compensation, of input video component 1301 comprises smear-bias control block 1302, transistor 1312, capacitors 1314, load resistor 1306, variable transconductance amplifier 1309, and operational amplifier 1316. Smear-Bias 1302 is used to control the gain of variable transconductance amplifier 1309 by adjusting output voltage 1304 through variable resistor 1303. That is, the loop gain may be modified by varying the bias of variable transconductance amplifier 1309. By varying the bias of the emitter coupled transistor pair (e.g., 1308 and 1310), current is divided between the transistors. The amount of current directed to the load resistor (e.g., 1306) determines the gain of the circuit. Almost no compensation is required for short distances therefore the gain may be reduced to almost zero (see k in FIG. 17). However, more compensation (i.e., higher gain) would be required for longer cable lengths because of the increase in diffusion line loss with distance. Note that if the gain of the compensation signal is zero it has no effect on the signal path in that the compensation network contributes no current to the virtual ground at 1314. High linearity may be maintained by placing the video signal 1301 in the emitter follower portion of the amplifier. A plurality of low frequency compensation, using the technique illustrated in FIG. 13, may be cascaded to provide the necessary frequency range coverage.

Due to the frequency dependency of the transmission line from a lumped, to diffusion, to low loss, then skin effect, frequencies in these regions propagate to the load at different rates. An embodiment of the present invention uses an anti-smear circuitry 1302 to provide compensating phase advance thus providing for a more faithful reproduction of the signal.

Figure 16:
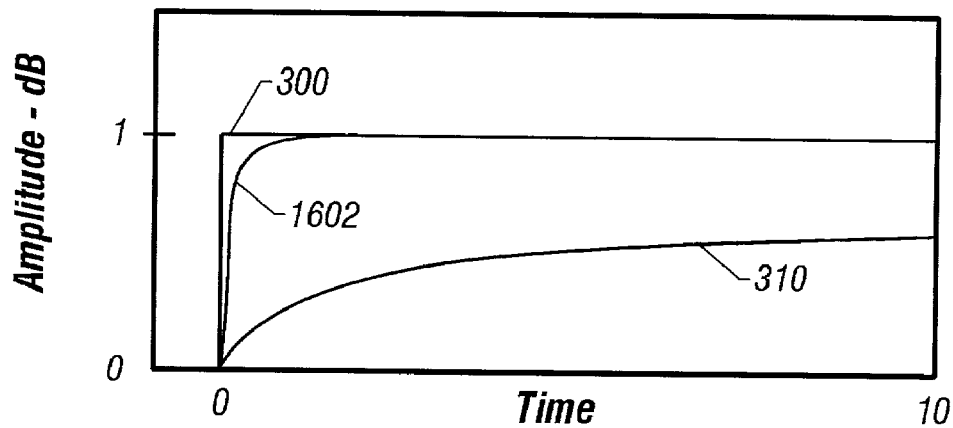
FIG. 16 is a transient response representation of the video response with low frequency equalization.

FIG. 16 is a transient response representation of the video response with low frequency equalization. As discussed earlier, lines 300 and 310 are the step function input and diffusion line responses, respectively. Line 1602 represents the transient response after inverse diffusion compensation. As shown, embodiments of the present invention significantly improve the rise time of the video signal thus compensating for the diffusion effects of transmission over twisted pair cables.

Skew Adjustment

Components of the video may arrive at the receiver at different times since multiple pairs are used to simultaneously deliver the video from the transmitter to the receiver. These delays or skew in data arrival time must be minimized or compensated for in order to properly reproduce the video. Delays may be due to reasons such as: wire length disparities, varying impurities, switches, splitters, etc. In one embodiment of the present invention, compensation is added using non-minimum zero phase type filter to delay the faster arriving signal to coincide with the phase of the later signal. The non-minimum phase zero filter is an all-pass type filter which adds delay equal to ½ wave period of its pole frequency for signal energy with frequency higher than the pole frequency. A non-minimum phase filter with the pole (denominator) frequency equal to the zero (numerator) frequency provides analog delay compensation equivalent to $e_{-TS}$, where T is the desired delay in seconds and is equivalent to one-half the time constant of the filter.

Figure 14:
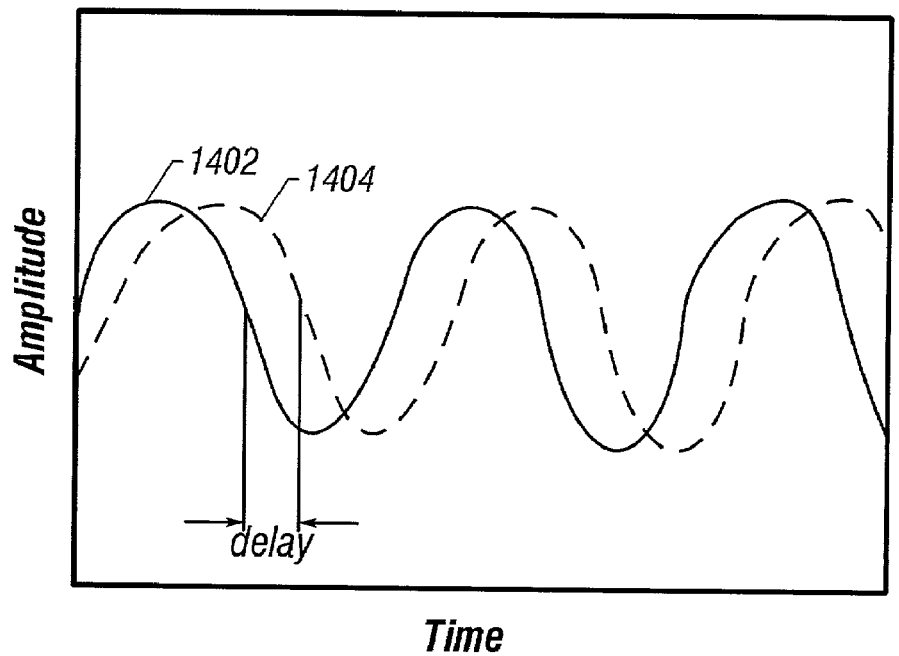
FIG. 14 is an illustration of the effect of a non-minimum phase zero filter on an input signal with fixed frequency.
Figure 15:
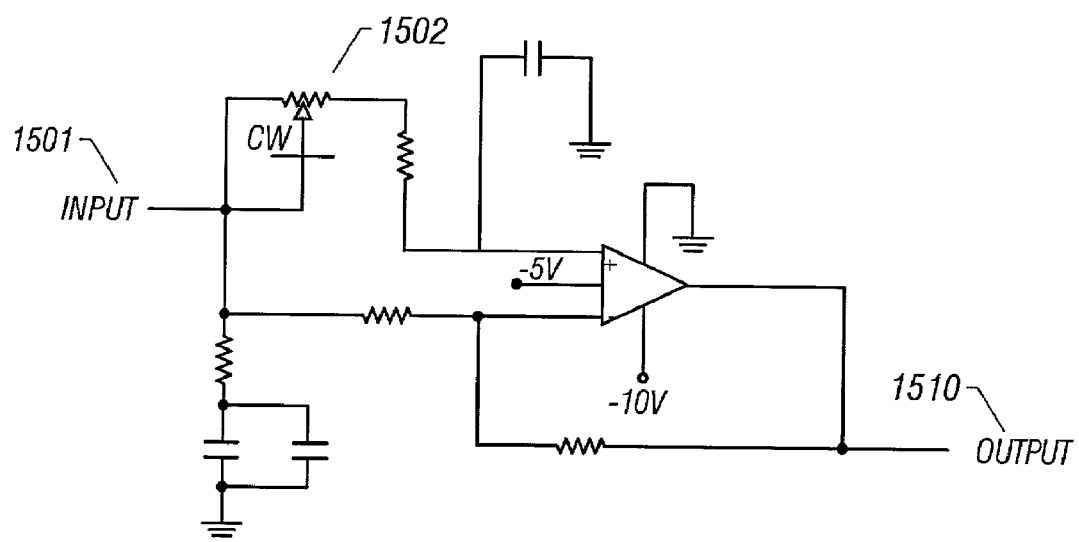
FIG. 15 is a representative circuit diagram illustrating an implementation of the non-minimum phase filter in accordance with an embodiment of the present invention.

FIG. 14 is an illustration of the effect of a non-minimum phase zero filter on an input signal with fixed frequency. The non-minimum phase filter initially reverses the phase of the incoming signal 1402 thus resulting in an output signal 1404 with a phase shift (i.e., delay) equivalent to ½ of its pole frequency. FIG. 15 is a representative circuit diagram illustrating an implementation of the non-minimum phase filter in accordance with an embodiment of the present invention. Input signal 1501 is passed through the non-minimum phase filter to add the needed skew/delay thus adjusting the phase at output signal 1510. Embodiments of the invention may provide for adjustment of the pole/zero frequency using variable resistor 1502, for example.

High Frequency Equalization

Figure 18:
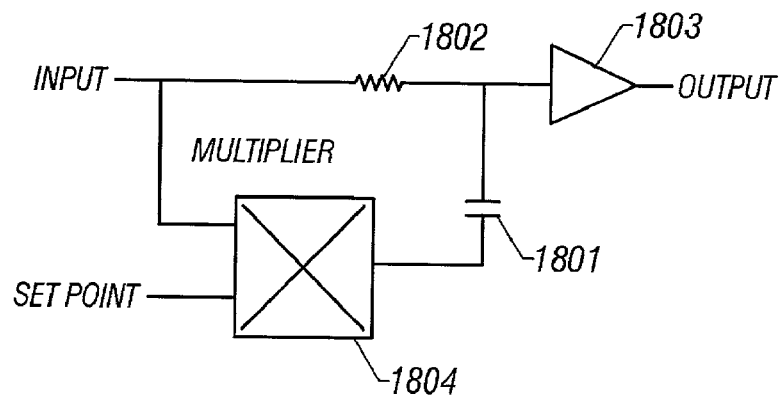
FIG. 18 is an illustration of the receiver high frequency compensation.

High frequency compensation at the receiver comprises compensating for the skin effect losses that occurred during transmission of the video signal from the transmitter to the receiver over twisted pair cable. For example, for the high frequency compensation, the receiver may remove unneeded high frequency compensation applied at transmitter 704, or further assist this high frequency compensation. In either case, the purpose of the compensation at the receiver is to match and thus recover the square root of frequency characteristic loss caused by skin effect. FIG. 18 is an illustration of the receiver high frequency compensation.

This simplified illustration comprises resistor 1802, capacitor 1801, amplifier 1803, and multiplier 1804. Recovery of the square root of frequency characteristic loss of skin effect may be done by modification of the effect of the capacitor 1801 in a low-pass filter (RC network) by applying signal to its reference leg (i.e., 1804). If no signal is present at 1804, the full effect of the capacitor is felt in the filter. If the signal is the same as that on the R (i.e., 1802) of the RC filter then the capacitor contributes no current to the system and the circuit is opened. If the signal is more than that which is applied to the R then the low pass filter is transformed into a high pass filter. Embodiments of the invention may employ a standard variable transconductance amplifier to control the level of the signal. The gain may be set by a current division in the common emitter circuit. The gain of the stage determines the pole of the succeeding RC low pass filter. An additional capacitor may be added in the signal path in the 50 MHz region to partially compensate for the square root of frequency characteristic of skin effect losses.

Thus, a method and apparatus for equalization of video insertion loss due to transmission over twisted pair cable lines have been described in conjunction with one or more specific embodiments. The invention is defined by the claims and their full scope of equivalents.

What is claimed is:

1. A method for equalizing video transmitted over twisted pair cable comprising:
   receiving an input video signal having a plurality of components;
   generating a first plurality of compensated components by applying at least one compensation to each of said plurality of components of said video signal;
   transmitting each of said first plurality of compensated components over a twisted pair cable to a receiving station, said first plurality of compensated components being transmitted over a plurality of twisted pair cables;
   generating a second plurality of compensated components from said first plurality of compensated components by applying inverse compensation to compensate for accumulated losses in each of said first plurality of compensated components due to transmission over said twisted pair cable;
   generating a third plurality of compensated components by applying, to each of said second plurality of compensated components, a desired phase skew using a non-minimum phase zero filter such that all of said third plurality of compensated components are in phase, said non-minimum phase zero filter having a pole and zero that are equivalent, said pole and zero being adjustable to achieve said desired phase skew; and
   outputting said third plurality of compensated components on an output device.

2. The method of claim 1, wherein said plurality of components comprises a color system's color components.

3. The method of claim 1, wherein each of said plurality of components comprises a high frequency portion and a low frequency portion.

4. The method of claim 3, wherein said at least one compensation comprises boosting of said high frequency portion such that said high frequency portion of each of said plurality of components is received at said receiving station.

5. The method of claim 1, wherein said inverse compensation comprises:
   low frequency shaping to account for diffusion effect losses occurring during transmission over said twisted pair cable; and
   high frequency shaping to account for skin effect losses occurring during transmission over said twisted pair cable.

6. The method of claim 5, wherein said high frequency shaping comprises applying a compensation network that effectively compensates for said skin effect losses.

7. The method of claim 1, wherein said twisted pair cable is unshielded twisted pair.

8. The method of claim 1, wherein said inverse compensation is adjustable.

9. The method of claim 1, wherein said first plurality of compensated components is generated in a transmitting station.

10. The method of claim 1, wherein said second plurality of compensated components is generated in said receiving station.

11. The method of claim 1, wherein said first plurality of compensated components and said second plurality of compensated components are generated in said receiving station.

12. The method of claim 1, wherein said first plurality of compensated components and said second plurality of compensated components are generated in a transmitting station.

13. A method for equalizing video transmitted over twisted pair cable comprising:
   receiving an input video signal having a plurality of components, wherein said plurality of components comprises a color system's color components;
   generating a first plurality of compensated components by applying high frequency boosting compensation to each of said plurality of components of said video signal;
   transmitting each of said first plurality of compensated components over a twisted pair cable to a receiving station said first plurality of compensated components being transmitted over a plurality of twisted pair cables;
   generating a second plurality of compensated components from said first plurality of compensated components by applying inverse compensation to compensate for accumulated losses in each of said first plurality of compensated components due to transmission over said twisted pair cable;
   generating a third plurality of compensated components by applying, to each of said second plurality of compensated components, a phase skew such that all of said third plurality of compensated components are in phase, wherein said phase skew is applied using a non-minimum phase zero filter, said non-minimum phase zero filter having a pole and zero that are equivalent, said pole and zero being adjustable to achieve said desired phase skew;
   outputting said third plurality of compensated components on an output device.

14. An apparatus for equalizing video transmitted over twisted pair cable comprising:
   a transmitter receiving an input video signal having a plurality of components;

a first compensation network in said transmitter generating a first plurality of compensated components by applying at least one compensation to each of said plurality of components of said video signal;

a plurality of twisted pair cables for transmitting said first plurality of compensated components, wherein each of said first plurality of compensated components is transmitted over a twisted pair cable of said plurality of twisted pair cables to a receiving station;

a second compensation network in said receiving station for generating a second plurality of compensated components from said first plurality of compensated components by applying inverse compensation to compensate for accumulated losses in each of said first plurality of compensated components due to transmission over said twisted pair cable;

a phase delay network in said receiving station for generating a third plurality of compensated components by applying, to each of said second plurality of compensated components, a desired phase skew using a non-minimum phase zero filter such that all of said third plurality of compensated components are in phase, said non-minimum phase zero filter having a pole and zero that are equivalent, said pole and zero being adjustable to achieve said desired phase skew; and an output device for outputting said third plurality of compensated components.

15. The apparatus of claim 14, wherein said plurality of components comprises a color system's color components.

16. The apparatus of claim 14, wherein each of said plurality of components comprises a high frequency region and a low frequency region.

17. The apparatus of claim 16, wherein said at least one compensation comprises boosting of said high frequency region such that said high frequency region of each of said plurality of components is received at said receiving station.

18. The apparatus of claim 14, wherein said inverse compensation comprises:

low frequency shaping to account for diffusion effect losses occurring during transmission over said twisted pair cable; and high frequency shaping to account for skin effect losses occurring during transmission over said twisted pair cable.

19. The apparatus of claim 18, wherein said high frequency shaping comprises applying a compensation network that effectively compensates for said skin effect losses.

20. The apparatus of claim 14, wherein said twisted pair cable is unshielded twisted pair.

21. The apparatus of claim 14, wherein said inverse compensation is adjustable.

22. The apparatus of claim 15, wherein said color system is RGB.

* * * * *